United States Patent [19]

Drigani

[11] Patent Number: 5,927,376
[45] Date of Patent: Jul. 27, 1999

[54] METHOD TO SHEAR SLABS ARRIVING FROM A CONTINUOUS CASTING PLANT AND RELATIVE DEVICE

[75] Inventor: Fausto Drigani, Zugliano, Italy

[73] Assignee: Danieli & C. Officine Meccaniche SpA, Buttrio, Italy

[21] Appl. No.: 08/946,649

[22] Filed: Oct. 7, 1997

[30] Foreign Application Priority Data

Oct. 7, 1996 [IT] Italy .................................. UD96A0187

[51] Int. Cl.$^6$ ................................................. B22D 11/126
[52] U.S. Cl. .......................... 164/460; 164/263; 72/203
[58] Field of Search .................................. 164/460, 423, 164/476, 477, 417, 263; 83/694; 72/203

[56] References Cited

U.S. PATENT DOCUMENTS 3,648,359 3/1972 Dennis .

FOREIGN PATENT DOCUMENTS 1012271 12/1965 United Kingdom .

*Primary Examiner*—Kuang Y. Lin
*Attorney, Agent, or Firm*—Antonelli, Terry, Stout & Kraus, LLP

[57] ABSTRACT

Method and device to shear slabs arriving from a continuous casting plant, where the slabs (13) leaving the continuous casting plant are sent to be sheared to size so as to obtain sections which are speeded up and sent for rolling, there being included, immediately upstream of the shearing assembly, a pinch roll assembly comprising at least two opposite rolls (14a, 14b), the shearing assembly comprising shearing elements (11, 12) coordinated and arranged on opposite sides with respect to the feeding plane of the slabs (13) during the shearing step, the shearing elements (11, 12) acting on the leading end (13a) of the slab (13) in such a way as to cause the leading end (13a) to rise up in a controlled manner by means of lifting the lower shearing element (12) to a height which is at least more than the feeding plane of the slab (13), the opposite rolls (14a, 14b) of the pinch roll assembly arranged immediately upstream of the shearing assembly (10) being maintained closed in contact with the slabs (13) during the shearing so as to function as a contrast and abutment element.

13 Claims, 1 Drawing Sheet

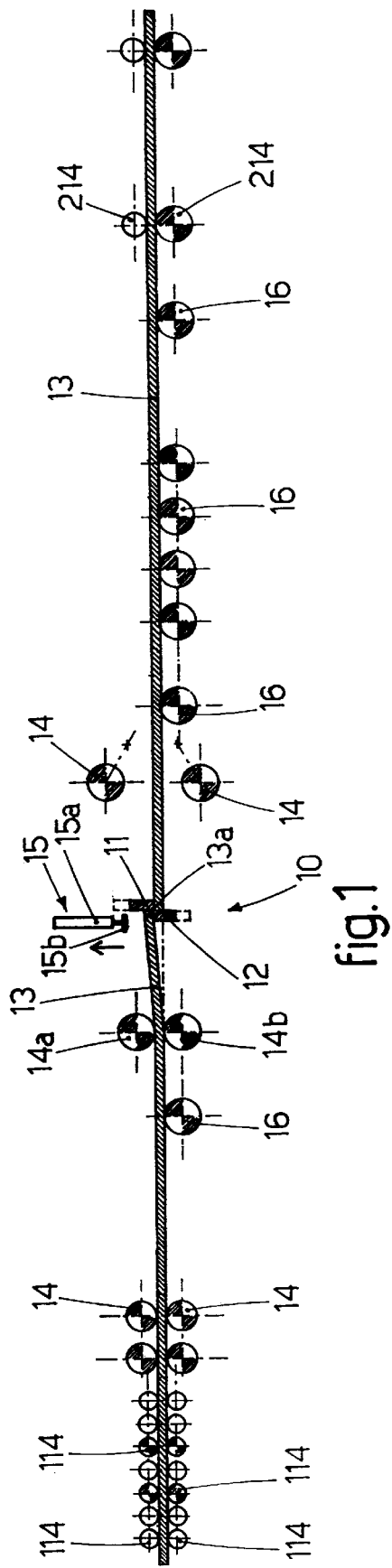
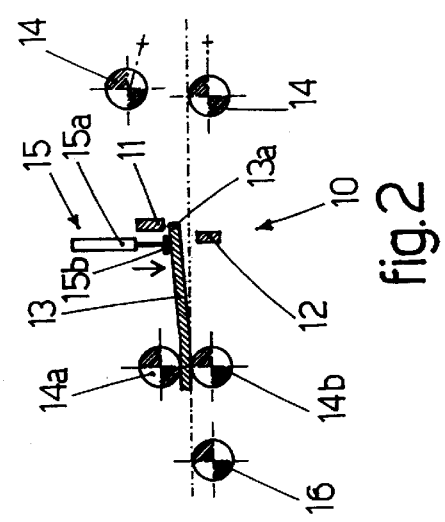

METHOD TO SHEAR SLABS ARRIVING FROM A CONTINUOUS CASTING PLANT AND RELATIVE DEVICE

BACKGROUND OF THE INVENTION

This invention concerns a method to shear slabs arriving from the continuous casting plant and the relative device.

The invention is applied in rolling lines associated with continuous casting machines and to be more exact in the section immediately after the outlet of the continuous casting machine.

In rolling mill plants, the slab as it leaves the continuous casting machine is sent to be sheared for size so as to prepare the sections which are speeded up and sent to be rolled.

The high temperature of the slab at this point causes conditions of great plasticity, and the slab is therefore easily deformed.

As it leaves the shearing means, during the intervals between the carrying and supporting rolls where there is no support, the leading end of the slab tends to bend downwards as a result of its own weight; the greater the distance between adjacent rolls, the greater is this tendency to bend.

This lowering of the leading end of the slab causes a great danger of the slab knocking against the carrying rolls and pinch rolls, which consequently causes damage both to the slab and the rolls.

This bending, when it is not obviated by the guide boxes for the rolled stock which are located upstream of the mill rolls, can even cause the slab to jam on the rolls themselves, which causes a blockage of the line and considerable problems to restart the line.

This problem moreover is particularly serious when it concerns the carrying rolls inside the tunnel furnace which is included downstream of the shearing means. The rolls inside the furnace, in fact, are made of fragile material, able to resist high temperatures and therefore more vulnerable to the mechanical stresses caused when they are knocked by the leading end of the slab.

When there are frequent knocks and blockages, there is therefore a quicker wear of the elements comprising the rolling train, particularly the rolls, and there is a greater possibility of damage and/or localised breakdowns. This implies a more frequent replacement or repair of the parts of the rolling mill and consequently an interruption in the production cycle with a resulting increase in maintenance costs and down times.

As a consequence of the knocks and blockages and therefore of the resulting mechanical stresses, the slab too is in a deteriorated condition when it enters the rolling train, which leads to imperfect working and in any case a poor quality product is obtained.

SUMMARY OF THE INVENTION

The applicants have designed, tested and embodied this invention to overcome the shortcomings of the state of the art, which those in the field have complained about for a long time now, and to achieve further advantages.

The purpose of the invention is to obtain a method, and the relative device, to shear slabs coming from the continuous casting machine which makes it possible to lift the leading end of the slab to a desired value during the shearing step.

According to the invention, this lifting prevents, or at least limits, any possible blockages of the slab on the pinch rolls, the support rolls and the carrying rolls and, consequently, increases the working life, in good condition, of these rolls and the other guiding elements of the rolling train.

Another purpose of the invention is to prevent deformations in the slab caused by its knocking on the rolls which are present on its travel to the rolling train.

The device according to the invention consists of a pair of shearing elements, opposite each other and cooperating, which occupy a different position according to the stage which the working cycle has reached.

Upstream of the shearing elements there is a pinch roll assembly comprising at least two opposite rolls.

As the slab advances, the shearing elements are positioned respectively above and below the travelling plane of the slab at pre-determined heights according to the thickness of the slab.

At the moment when the slab, which has been fed forward by the pinch rolls, reaches the correct position for shearing to size, the upper shearing element descends so as to rest on the upper surface of the slab, thus acting to contrast the shearing action; at the same time the lower element moves upwards pushing the slab to a pre-determined height.

During the shearing step, the pinch rolls arranged immediately upstream of the shearing elements maintain their closed position in contact with the slab. These coordinated movements of the shearing elements, together with the contrast supplied by the pinch rolls, cause the slab to be sheared with a deformation and bending of the leading end.

The section thus obtained is carried by the carrying rolls until it reaches the tunnel furnace and then the rolling train.

During its travel, the raised leading end of the slab tends to bend down again, as a result of its own weight, progressively straightening itself until it substantially regains the form it had prior to the shearing operation. This lowering of the leading end can take place in different times according to the conditions in the working cycle of the rolling line and the characteristics of the material which the slab is made of.

If the leading end is raised to a pre-determined height, taking into account these conditions and characteristics, it is possible to prevent a premature and excessive lowering of the leading end, thus avoiding the risk of blockages and damage to the rolls which carry the slab.

According to the invention, the method provides for the gauging of the movements of the elements which contrast the shearing action in such a way as to raise the leading end of the slab to the desired height.

In this way, the leading end of the slab will remain in a sufficiently raised position for the whole of its travel towards the rolling train, by which time the lowering of the leading end will have been completed, and the slab will have been reduced to ideal working conditions.

According to a variant, in cooperation with the shearing means there is a pressure unit which intervenes when it becomes necessary to correct and/or gauge the height to which the leading end is lifted.

This pressure unit is advantageously actuated according to signals transmitted by control and monitoring sensors so as to provide the desired adjustment to the lifting of the leading end of the slab.

According to another variant, the upper roll of the pinch roll assembly placed upstream of the shearing means, which functions as a contrast element during the shearing step, can be regulated in height, which makes it possible to vary the height to which the slab is raised as a result of the lifting and shearing action.

According to another variant, the distance between the rolls of the pinch roll assembly and the shearing means can be adjusted so as to permit a further adjustment of the bending and lifting of the slab.

The rolls of the pinch roll assembly can be adjusted in coordination with the actuation of the pressure unit, if included, or they can act autonomously according to contingent requirements.

BRIEF DESCRIPTION OF THE DRAWINGS

The attached figures are given as a non-restrictive example, and show a preferred embodiment of the invention as follows:

FIG. 1 shows a section of the rolling line comprising the device according to the invention during the shearing step;

FIG. 2 shows the device according to the invention with the shearing elements in the non-operative position.

DETAILED DESCRIPTION OF THE PREFERRED EMBODIMENTS

The shearing device 10 for slabs according to the invention is placed, in the rolling line, immediately downstream of the last containing rolls 114 of the continuous casting machine.

The device 10 comprises two shearing elements, respectively 11 and 12, offset with respect to the shearing axis and on opposite sides of the horizontal plane on which the slab 13 is fed.

As the slab 13 arriving from the continuous casting machine advances, the shearing elements 11, 12 are in their non-operative position, one 11 above and the other 12 below the plane defined by the carrying rolls 16.

When the slab 13 reaches the shearing position, the shearing element 11 is lowered until it comes into contact with the upper surface of the slab 13; in a coordinated manner, the shearing element 12 is raised, thus pushing the slab 13 upwards.

The shearing element 12 is shaped in such a way as to ensure optimum support for the slab 13 as it is raised.

During this step, the pinch rolls 14a and 14b arranged immediately upstream of the shearing elements 11 and 12 remain in their active position, closed on the respective faces of the slab 13, applying a contrasting action to the action of the shearing elements 11 and 12.

This contrast stabilizes the deformation of the section of the leading end of the slab 13 in the position imparted by the shearing elements.

The coordinated movements of the shearing elements 11 and 12, together with the contrast supplied by the pinch rolls 14a and 14b, cause the slab 13 to be cropped and the leading end 13a raised.

The slab 13 thus cropped can therefore reach the tunnel furnace, and then the rolling train, with a greatly reduced risk of knocks against and blockages on the pinch rolls 14, the carrying rolls 16, the containing rolls 214 and the downstream rolls.

The height to which the leading end is raised can be pre-determined, according to the characteristics of the material of which the slab 13 is made, and the ambient conditions where the working cycle is to be carried out, by gauging the coordinated movements of the two shearing elements 11 and 12.

In this way, after shearing, the leading end 13a of the slab 13 undergoes a progressive controlled lowering until it reaches the entrance of the rolling train in optimum conditions to be inserted into the guide boxes which guide the rolled stock and thence to the rolls.

In this case, in cooperation with the shearing device 10 there is a pressure unit 15, arranged immediately upstream of the shearing elements 11, 12 and above the slab 13.

According to a variant which is not shown here, the pressure unit 15 is arranged immediately downstream of the shearing device 10.

In the case shown in FIGS. 1 and 2, the pressure unit 15 comprises a cylinder 15a inside which there is a piston 15b which acts directly on the leading end 13a of the slab 13.

The pressure unit 15 makes it possible to adjust and gauge the height to which the leading end 13a of the slab 13 is raised, and is actuated if necessary in the stage immediately following the shearing step, when the heights to which the leading end 13a of the slab 13 is to be raised are desired to be less than those obtained by the shearing action.

The actuation of the pressure unit 15 makes it possible to gauge the height precisely, according to the value which is estimated as being optimum in order to obtain the best possible entrance of the slab 13 into the rolling train. The pressure unit 15 is advantageously associated with monitoring sensors which provide signals to adjust and control the actuation of the pressure unit 15. According to a variant, at least the height of the support roll 14a of the pair of pinch rolls 14a, 14b can be adjusted.

According to the position taken by the support roll 14a at the moment when shearing is performed with respect to the upper face of the slab 13, it is possible to modify the geometry of the lifting of the slab 13 depending on the predetermined deformation of the slab during its travel towards the rolling train.

According to another variant, the longitudinal position of the support roll 14a with respect to the shearing device 10 can be adjusted so as to modify the geometry of the deformation of the forward section of the slab 13 and therefore the height to which it is bent.

The support roll 14a can be positioned in a coordinated manner to or autonomous manner from the pressure unit 15 depending on the solutions and/or requirements of the case.

I claim:

1. Method to shear slabs arriving from a continuous casting plant, in which the slabs leaving the continuous casting machine are sent to be sheared to size to obtain sections which are speeded up and delivered to the rolling train, comprising: feeding a slab leaving the continuous casting machine to a pinch roll assembly comprising at least two opposite rolls, feeding the slab to a shearing assembly comprising upper and lower shearing elements coordinated and arranged on opposite sides with respect to the plane on which the slab is fed, the pinch roll assembly being provided immediately upstream of the shearing assembly, actuating the shearing elements, including lifting the lower shearing element so as to act on the leading end of the slab in such a way as to cause the leading end to be raised in a controlled manner to a height at least above the plane on which the slab is fed, and maintaining the opposite rolls of the pinch roll assembly placed immediately upstream of the shearing assembly closed and in contact with the slab during the shearing step to function as abutment and contrast elements.

2. Method as in claim 1, in which the height to which the leading end of the slab is lifted is predetermined as a function of the working cycle of the rolling train and the characteristics of the material, in such a way that the slab is substantially straight when it enters the rolling train.

3. Method as in claim 1, in which the height to which the leading end of the slab leaving the shearing assembly is raised is defined by adjusting the height to which the lower shearing element is raised with respect to the plane on which the slab if fed.

4. Method as in claim 1, in which the height to which the leading end of the slab leaving the shearing assembly is raised is defined by the position of a pressure unit acting from above on the leading end and placed in close proximity with the shearing assembly.

5. Method as in claim 1, in which the height to which the leading end of the slab leaving the shearing assembly is raised is defined by adjusting the height of the support roll of the pinch roll assembly arranged upstream of the shearing assembly with respect to the relative face of the slab.

6. Method as in claim 1, in which the height to which the leading end of the slab leaving the shearing device is raised is defined by means of adjusting the longitudinal distance between the rolls of the pinch roll assembly and the shearing device assembly.

7. Device to shear slabs leaving the continuous casting machine, arranged immediately downstream of the last containing rolls of the continuous casting machine, comprising: at least two shearing elements cooperating and arranged on opposite sides of the horizontal plane on which the slab is fed, and a pinch roll assembly provide upstream of the shearing elements and comprising two opposite rolls, the shearing elements being arranged offset with respect to a shearing axis and on opposite sides of the plane on which the slab is fed, the shearing elements including a first non-operative position removed from the respective faces of the slab and a second shearing position cooperating with the respective faces of the slab, at least the lower shearing element including an initial shearing position, at which the shearing elements begin to shear the slab, above the horizontal plane on which the slab is fed, the pinch rolls including, during the shearing step, a closed position in contact with the respective faces of the slab.

8. Device as in claim 7, which comprises a pressure unit arranged in a position near the shearing elements above the horizontal plane of the slab.

9. Device as in claim 8, in which the pressure unit is arranged immediately upstream of the shearing elements.

10. Device as in claim 8, in which the pressure unit is arranged immediately downstream of the shearing elements.

11. Device as in claim 8, in which the pressure unit cooperates with actuation means governed by means to monitor and measure the value of the height to which the leading end of the slab is raised.

12. Device as in claim 7, in which at least the support roll of the pinch roll assembly is adjustable in height.

13. Device as in claim 7, in which at least the longitudinal distance between the support roll of the pinch roll assembly and the shearing device is adjustable.

\* \* \* \* \*